United States Patent
Schweiger et al.

(10) Patent No.: US 6,193,237 B1
(45) Date of Patent: Feb. 27, 2001

(54) LAYER INTERFERENCE ORIENTATION FOR HIGH TEMPERATURE GASKET

(75) Inventors: David J. Schweiger, Downers Grove; Neil A. Martin, Naperville, both of IL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 08/923,126

(22) Filed: Sep. 4, 1997

(51) Int. Cl.⁷ .................................................. F02F 11/00
(52) U.S. Cl. ............................................ 277/598; 411/999
(58) Field of Search ................................... 277/591, 598, 277/608, 609, 630, FOR 235; 411/352, 965, 999; 29/890.08; 285/391, 910

(56) References Cited

U.S. PATENT DOCUMENTS

| | | | |
|---|---|---|---|
| 1,788,337 | * | 1/1931 | Scott ................................ 277/591 X |
| 4,768,259 | * | 9/1988 | Rock et al. ........................ 411/352 X |
| 5,083,801 | * | 1/1992 | Okano et al. ........................ 277/598 |
| 5,259,629 | * | 11/1993 | Udagawa ............................ 277/598 |
| 5,368,316 | * | 11/1994 | Miyaoh .............................. 277/591 |
| 5,393,108 | * | 2/1995 | Kerr .................................... 285/368 |
| 5,513,855 | * | 5/1996 | Yasui .................................. 277/598 |
| 5,544,902 | * | 8/1996 | Belter ................................. 277/630 |
| 5,551,702 | * | 9/1996 | Inamura .............................. 277/598 |
| 5,586,770 | * | 12/1996 | Udagawa et al. .................... 277/598 |
| 5,791,660 | * | 8/1998 | Belter ............................. 277/630 X |

* cited by examiner

Primary Examiner—Eric K. Nicholson
Assistant Examiner—Greg Binda
(74) Attorney, Agent, or Firm—Rader, Fishman & Grauer PLLC

(57) ABSTRACT

A high temperature gasket assembly comprises a plurality of identical symmetrically shaped plates with holes offset from a centerline of each plate. The plates are rotated or flipped into an orientation with the outer periphery of each plate in alignment and the holes in a first plate are skewed with respect to mating holes in a second plate. As a result, a portion of an inner periphery of each hole is in facing relation with an inner face of the other plate. The resulting aperture defines an interference orientation with a diameter greater than a minor thread diameter and less than a major thread diameter of a mating fastener. Thus, the fastener is retained within the aperture without undesirable separation.

21 Claims, 3 Drawing Sheets

US 6,193,237 B1

LAYER INTERFERENCE ORIENTATION FOR HIGH TEMPERATURE GASKET

FIELD OF THE INVENTION

The present invention relates to a gasket and more particularly to a layered interference orientation for a high temperature metallic gasket which captures threaded fasteners.

BACKGROUND OF THE INVENTION

Gaskets are often used as a seal between mating metal surfaces. One common application involves the placement of a gasket between a head and an exhaust manifold of an internal combustion engine. Another application involves gasket placement between the exhaust manifold and an exhaust pipe flange. Gaskets for either application can be considered high temperature gaskets and more particularly exhaust manifold gaskets since they provide an exhaust seal which prevents the byproducts of combustion exiting the engine from escaping into the engine compartment of a vehicle.

Exhaust manifold gaskets are typically installed by placing the gasket between an exhaust manifold and its mating component and aligning bolt holes or apertures formed in the gasket with corresponding holes formed in the manifold and mating component. A threaded fastener passes through the manifold and gasket and engages a corresponding threaded aperture formed in the mating component. Some maneuvering of the manifold and gasket relative to the mating component may be required to align the holes therein with the corresponding threaded apertures of the mating component before the fasteners can be inserted.

There are problems in such an assembly process. In particular, the gasket may slip from its desired position or drop off the end of the inserted fastener before it can be fixed in place between the exhaust manifold and its mating component. It would be highly desirable to have a gasket that will not fall off the threaded ends of the fasteners after they have passed through the holes formed in the gasket. Thus, an assembler could more easily maintain the gasket in position relative to the manifold when mating it to its mating component.

Several methods are known for capturing the threaded ends of fasteners, but they are ill suited for a high temperature gasket. One approach is to provide a star shape opening defining inwardly directed fingers in a soft gasket material. Pushing a threaded fastener through the gasket opening causes the fingers to open outwardly in the direction of fastener motion, partially engaging the fastener. The gasket material around the fastener is compressed upon assembly completion to provide a seal around it. Use of this configuration with a metallic high temperature gasket would be problematic because the high bending strength of metal resists bolt insertion and the resultant axially extending fingers prevent the manifold and its mating component from being drawn together to form the desired seal.

Retention means in gaskets have also been employed to fix a gasket over locating pins. For example, an aperture in the gasket has radially extending fingers which engage the pin. As the gasket is pushed down over the pin, the fingers deflect upwardly, locking the gasket to the pin. One difficulty with such an approach as applied to threaded fasteners is that with the fingers so engaging the fastener, the torque required to turn the fastener is undesirably increased. Another difficulty is that such a retention means may damage the fastener threads.

Finally, it is known to form specialized holes in the gasket which capture a threaded fastener. The holes require the use of specialized fingers with an inner diameter greater than a corresponding minor thread diameter and smaller than a corresponding major thread diameter. Such fingers require extremely high tolerances, increasing manufacturing cost. Further the use of the fingers can be easily compromised by inadvertent and not easily detected component misalignment during gasket assembly.

SUMMARY OF THE INVENTION

The present invention is directed to a high temperature gasket having a layered interference orientation to capture threaded fasteners.

The gasket includes at least two identical plates symmetrical about two perpendicular centerlines. Two holes are formed in each of the plates which are a common distance from each of the centerlines. In one embodiment, each of the holes are displaced the same distance on opposing sides of a centerline while in a second embodiment the holes are displaced the same distance on the same side of a centerline.

In an initial orientation the plates are aligned with each other with the holes also in alignment. Then, one of the plates is either flipped or rotated with respect to the second plate to a second orientation wherein two apertures are formed with a portion of the inner periphery of each hole in facing relation to an inner face of the other plate. If the holes formed in the plate are circular, the apertures formed when the plates are aligned with each other are generally oval. Thus, each hole of each plate is skewed with its mating hole to form the necessary apertures.

Once the plates are in a final orientation, a threaded fastener is inserted through each aperture. The fastener includes a major diameter between the crests of the thread teeth and a minor diameter across the roots of the teeth. The skewed nature of the holes creates an interference orientation which captures the fastener threads. Preferably, the inner periphery of the holes forming the aperture define a diameter greater than the minor thread diameter and less than the major thread diameter. Further, the plates should be sized such that their thickness is less than a corresponding extent between adjacent crests such that an edge of the plate is adjacent a root of the thread.

The use of identically shaped symmetrical plates allows the plates to be easily aligned with one another to ensure proper plate orientation and proper interference hole size. Gasket misalignment and malfunction is significantly reduced while simplifying manufacture and installation.

In an alternative embodiment, a metallic carrier may be disposed between each of the plates. The carrier provides improved rigidity, increased heat tolerance and additional gasket thickness.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

A high temperature gasket 10 is illustrated in FIGS. 1 through 4 for placement between two mating components such as an exhaust manifold of an internal combustion engine and either a head or an exhaust pipe flange (not shown). Gasket 10 is of metallic laminate construction with first and second layers or plates 12 and 14. Preferably, plates 12 and 14 are formed from steel. Each plate includes an exhaust flow opening 16 and two holes 18 and 20.

Figure 1:
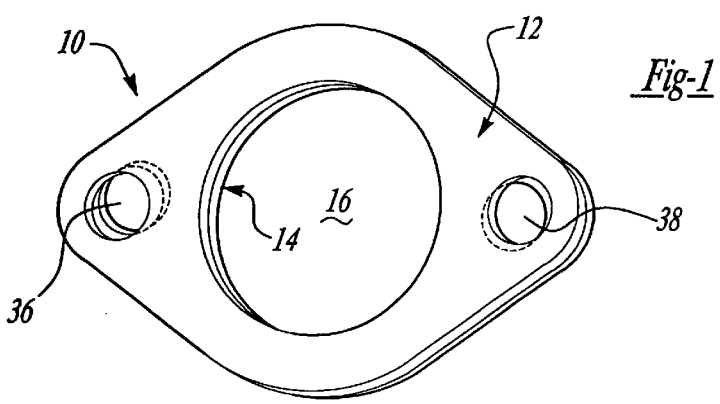
FIG. 1 is a perspective view of two identically shaped plates forming a first embodiment of the present invention, the second plate flipped with respect to the first plate and the bolt holes each skewed with respect to a centerline of the plate.
Figure 2:
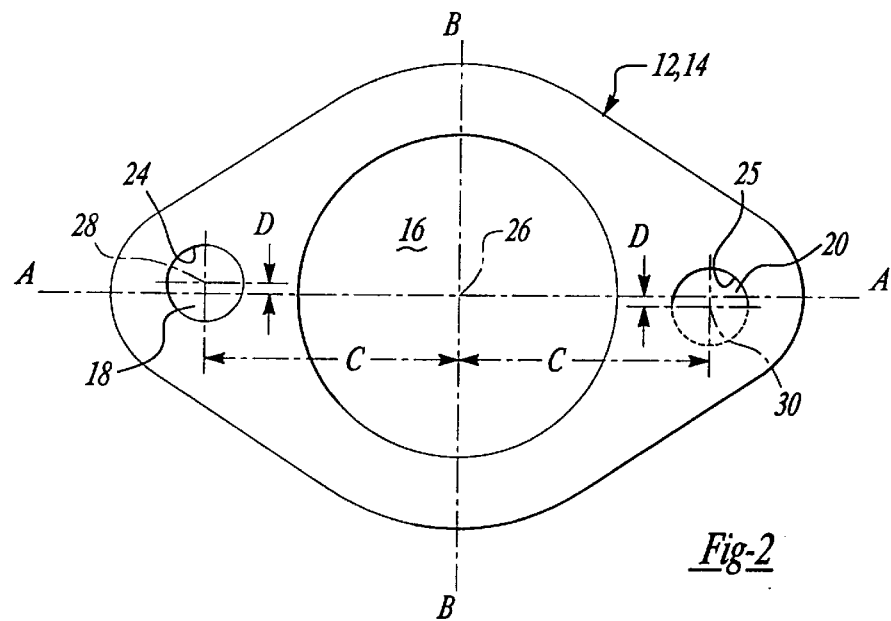
FIG. 2 is a planar view of one of the plates of the first embodiment showing the holes offset an equal amount on opposite sides of a centerline extending through the plate and intersecting the holes.
Figure 3:
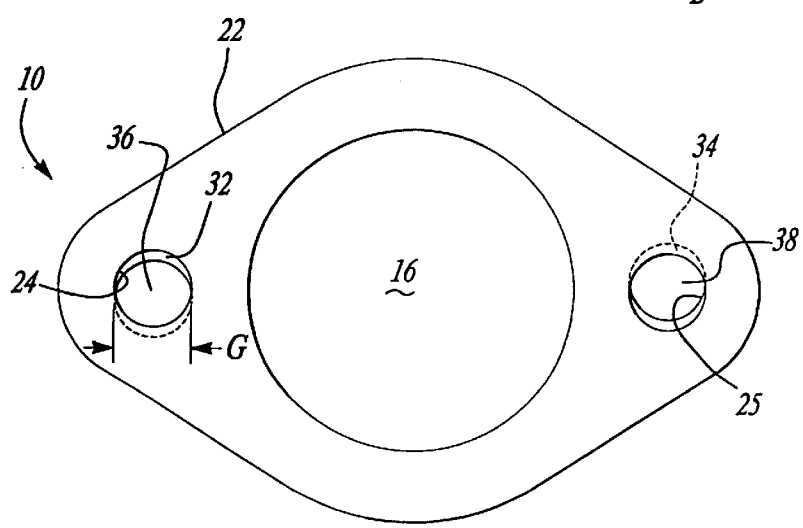
FIG. 3 is a planar view of the first embodiment.

Preferably, plates 12 and 14 are identical with a common outer periphery 22. Holes 18, 20 are preferably circular and share a common diameter defined by inner periphery 24, 25. As best illustrated in FIG. 2, each plate 12,14 includes two perpendicular centerlines A—A and B—B. Excluding the placement of holes 18, 20, each quadrant is symmetrical with respect to the other three quadrants. Holes 18,20 are each spaced an equal distance C from centerline B—B with their corresponding centerpoints 28, 30 offset in opposing directions an equal distance D from centerline A—A.

In an initial orientation, plates 12,14 are in complete alignment with one another. However, to form gasket 10, one of the plates 12, 14 is flipped about either centerline A—A or centerline B—B. Once one of the plates is flipped a portion of the inner periphery 24, 25 of each hole of plate 12 is in a facing relation with an inner face 32 of plate 14. Similarly, a portion of the inner periphery 24, 25 of each hole of plate 14 is in facing relation with an inner face 34 of plate 12. The two adjacent skewed holes define generally oval shaped apertures 36 and 38 which extend through the plates.

If plate 12 is flipped about centerline B—B, hole 18 of plate 12 is skewed with respect to hole 20 of plate 14 while hole 20 of plate 12 is skewed with respect to hole 18 of plate 14. However, just as easily, if plate 12 is flipped about centerline A—A, hole 18 of plate 12 is skewed with respect to hole 18 of plate 14 while hole 20 of plate 12 is skewed with respect to hole 20 of plate 14.

Figure 4:
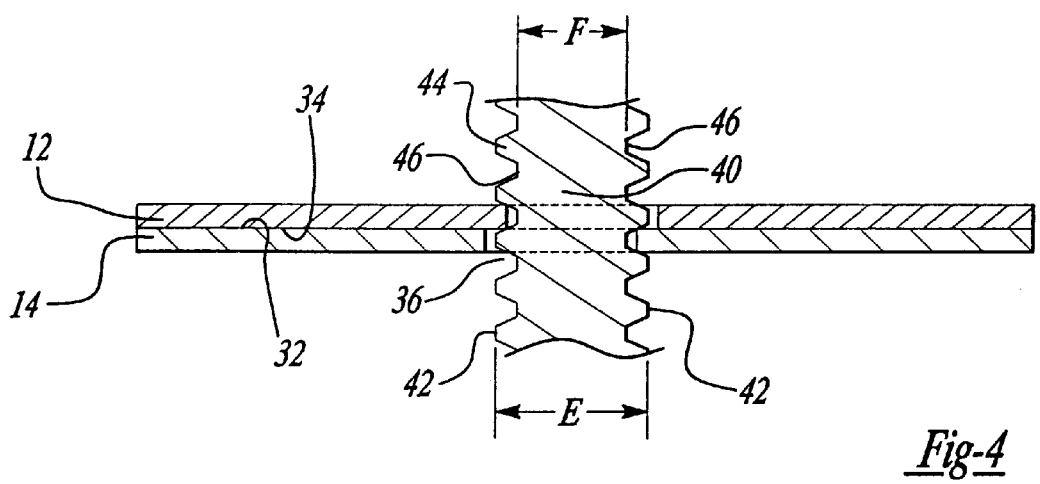
FIG. 4 is a cross-sectional view of the first embodiment including a portion of a thread fastener.

A cross section of aperture 36 is shown in FIG. 4 and including a portion of a threaded fastener 40. Threaded fastener 40 has a major diameter E across crests 42 of thread teeth 44 and a minor diameter F across roots 46 of teeth. The oval shaped aperture defines a diameter G (shown in FIG. 3) larger than minor diameter F and smaller than major diameter E. Further, the plates have thickness less than a corresponding extent between adjacent crests 42 such that an edge of a plate 12, 14 is adjacent a root 46. Therefore, it is possible to thread the fastener through aperture 36. Alternatively, if plates 12, 14 are thin enough it is possible for apertures 36, 38 to deflect axially, allowing fastener 40 to be inserted through the aperture. The affected portions of inner peripheries 24 spring back to be captured between adjacent crests 42.

Figure 5:
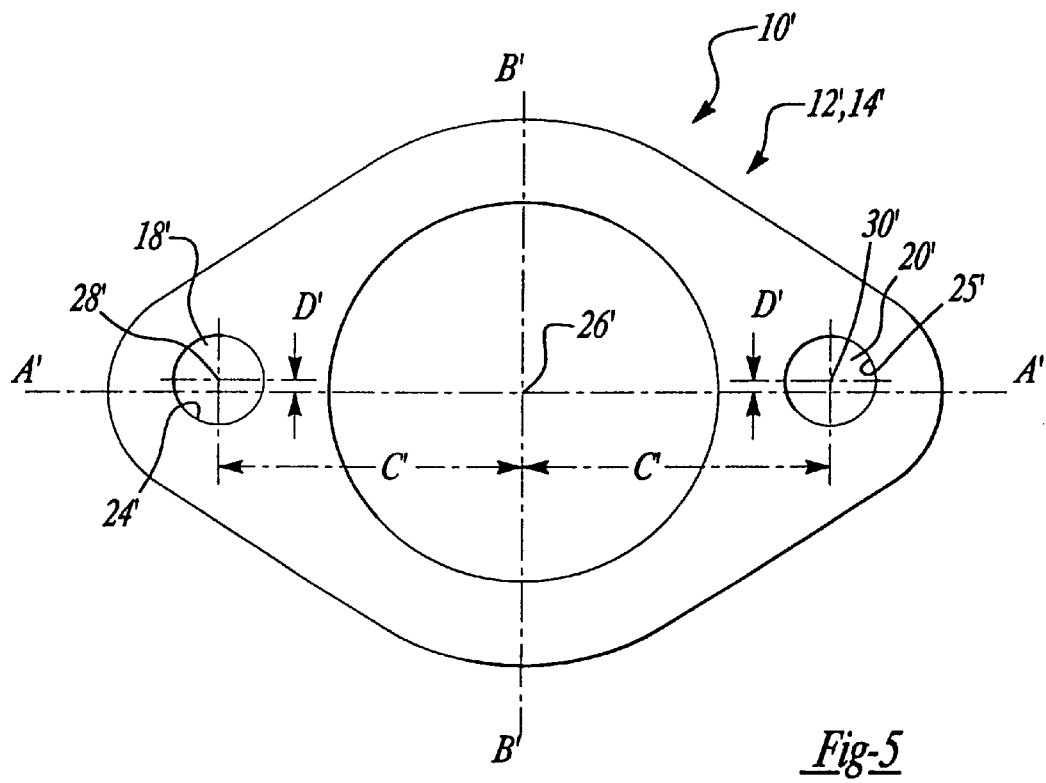
FIG. 5 is a planar view of one of the plates of a second embodiment of the present invention showing the fastener holes offset an equal amount on the same side of a centerline extending through the plate and intersecting the holes.
Figure 6:
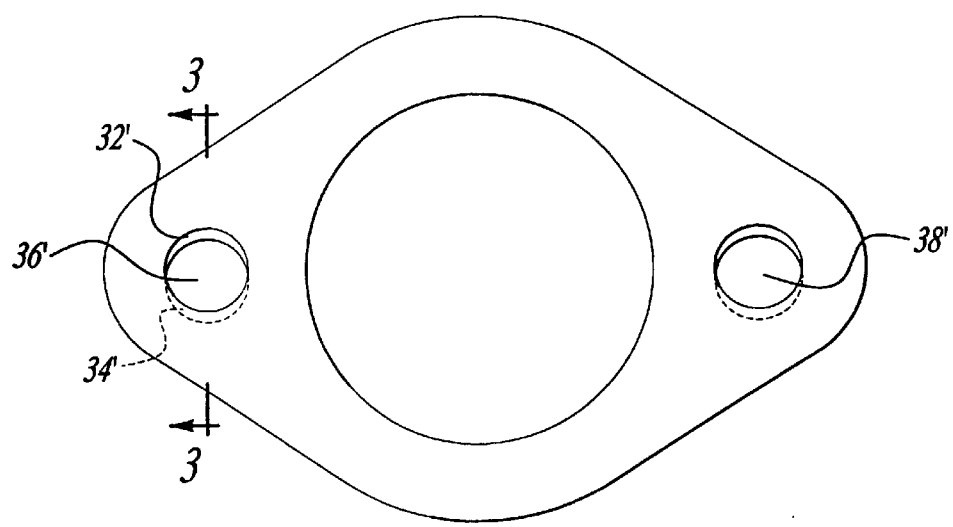
FIG. 6 is a planar view of the second embodiment.

A second embodiment of a gasket 10' using plates 12' and 14' is shown in FIGS. 5 and 6. Plates 12', 14' are identical and gasket 10' is essentially identical to gasket 10 except for the relative offset of holes 18', 20' with respect to centerline A—A. Holes 18',20' are each spaced an equal distance C' from centerline B—B. However, their corresponding centerpoints 28', 30' are offset in the same direction an equal distance D' from centerline A—A.

In an initial orientation, plates 12',14' are in complete alignment with one another. However, to form gasket 10', one of the plates 12',14' may be rotated about centerpoint 26' 180 degrees. Alternatively, plate 12' may be flipped about centerline A—A. Once rotated or flipped, a portion of the inner periphery 24',25' of each hole of plate 12' is in a facing relation with an inner face 32' of plate 14'. Similarly, a portion of the inner periphery 24',25' of each hole of plate 14' is in facing relation with an inner face 34' of plate 12'. The two adjacent skewed holes define generally oval shaped apertures 36' and 38' which extend through the plates. If plate 12' is rotated, hole 18' of plate 12' is skewed with respect to hole 20' of plate 14' while hole 20' of plate 12' is skewed with respect to hole 18' of plate 14'. If plate 12' is flipped about centerline A—A, hole 18' of plate 12' is skewed with respect to hole 18' of plate 14' while hole 20' of plate 12' is skewed with respect to hole 20' of plate 14'.

Figure 7:
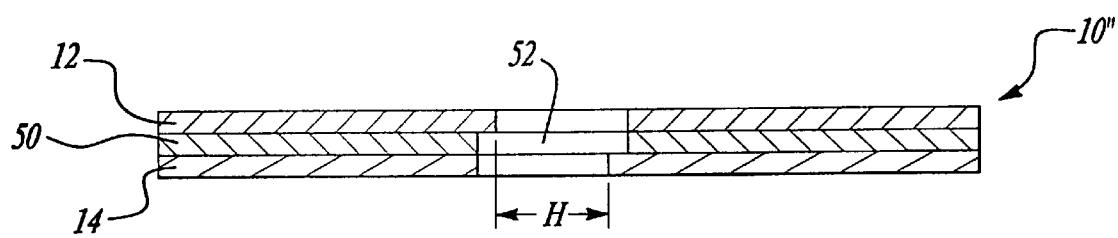
FIG. 7 is a cross sectional view of a third embodiment of the present invention showing a carrier disposed between opposing plates.

A third embodiment of the present invention is shown in FIG. 7. A metallic carrier 50 may be disposed between plates 12(12'), 14(14'). The use of such a metallic carrier provides a number advantages. For example, it provides rigidity to gasket 10". It also provides extra heat tolerance to the gasket. Finally, the use of carrier 50 provides additional gasket thickness in situations where such thickness is required. Carrier 50 includes an opening 52 which preferably corresponds to the greatest possible diameter H of apertures 36(36'), 38(38'). Alternatively, carrier 50 may be identical to plates 12(12') and 14(14') and oriented as desired.

The present invention provides a number of advantages. The use of identically shaped symmetrical plates allows the plates to be easily aligned with one another to ensure proper plate orientation and proper interference hole size. Thus, the possibility of gasket misalignment and malfunction is reduced. Further, the use of identical holes to form apertures 36 and 38 to capture a threaded fastener 40 significantly reduces problems with specialized holes requiring extremely high tolerances and increased manufacturing cost. Manufacturing cost is also reduced through the use of fewer uniquely designed components. Therefore, complex manufacturing is reduced.

The disclosed embodiments and examples are given to illustrate the present invention. However, they are not meant to limit the scope and spirit of the present invention. Therefore, the present invention should be limited only by the appended claims.

What is claimed is:

1. A high temperature gasket assembly for sealing two mating components, the gasket assembly comprising:

first and second metallic plates having a common outer periphery;

wherein said first plate has at least one hole defined by an inner periphery extending through said first plate and said second plate has at least one hole defined by an inner periphery extending through said second plate;

an aperture extending through said plates when said outer periphery of said plates are aligned such that said at least one hole of said first plate is skewed from said at least one hole of said second plate; and wherein said first and second plates are symmetrical about a first centerline dividing said plates in half, said at least one hole of each of said first and second plates being offset in at least one direction with respect to said first centerline.

2. A high temperature gasket as recited in claim 1, wherein a portion of said inner periphery of said at least one hole of said first plate is in facing relation with an inner face of said second plate and a portion of said inner periphery of said at least one hole of said second plate is in facing relation with an inner face of said first plate.

3. A high temperature gasket as recited in claim 2, wherein a carrier is disposed between said first and second plates, said carrier including at least one hole defining a portion of said aperture.

4. A high temperature gasket as recited in claim 2, wherein said holes of said first and second plates have a constant diameter about their periphery and said aperture is generally oval shaped.

5. A high temperature gasket as recited in claim 2, wherein said at least one hole of said first plate is offset in one linear direction with respect to said first centerline and said at least one hole of said second plate is offset in an opposite linear direction with respect to said first centerline.

6. A high temperature gasket as recited in claim 5, wherein the centerpoint of each of said at least one holes of said first and second plates is equally linearly spaced from the centerpoint of said assembly.

7. A high temperature gasket as recited in claim 6, wherein said first and second plates are symmetrical about a second centerline perpendicular with respect to said first centerline, said second centerline dividing each of said plates in half.

8. A high temperature gasket as recited in claim 7, wherein said first and second plates are identical.

9. A high temperature gasket as recited in claim 8, wherein each of said plates have first and second holes, each of said first and second holes offset in the same linear direction with respect to said first centerline of said plates intersecting said holes.

10. A high temperature gasket as recited in claim 9, wherein one of said first and second plates is rotated 180 degrees from an initial orientation with said first and second holes of said first and second plates in alignment to a second orientation such that said first hole of said first plate is skewed with respect to said second hole of said second plate and said second hole of said first plate is skewed with respect to said first hole of said second plate.

11. A high temperature gasket as recited in claim 9, wherein one of said first and second plates is flipped from an initial orientation with said first and second holes of said first and second plates in alignment to a second orientation such that said first hole of said first plate is skewed with respect to said first hole of said second plate and said second hole of said first plate is skewed with respect to said second hole of said second plate.

12. A high temperature gasket as recited in claim 8, wherein each of said plates have first and second holes, said first hole of each of said plates offset in an opposite linear direction from said second hole of each of said plates with respect to said first centerline of said plates intersecting said holes.

13. A high temperature gasket as recited in claim 12, wherein one of said first and second plates is flipped from an initial orientation with said first and second holes of said first and second plates in alignment to a second orientation such that said first hole of said first plate is skewed with respect to said second hole of said second plate and said second hole of said first plate is skewed with respect to said first hole of said second plate.

14. A high temperature gasket as recited in claim 13, wherein one of said first and second plates is flipped from an initial orientation with said first and second holes of said first and second plates in alignment to a second orientation such that said first hole of said first plate is skewed with respect to said first hole of said second plate and said second hole of said first plate is skewed with respect to said second hole of said second plate.

15. A high temperature gasket as recited in claim 8, wherein each of said plates have first and second holes, said first centerline of said plates intersecting said holes.

16. A high temperature gasket as recited in claim 15, wherein one of said plates is rotated or flipped with respect to said other plate such that said holes forming each said aperture are skewed with respect to each other.

17. A high temperature gasket assembly for sealing two mating components, the gasket assembly comprising:

first and second identical symmetrical plates, each of said plates having first and second holes, a centerline of said plates dividing said plates in half intersecting said holes, an aperture extending through said plates when an outer periphery of each said plate is aligned such that at least one of said first and second holes in said first plate is partially offset from at least one of said first and second holes in said second plate such that a portion of an inner periphery of at least one of said first and second holes of said first plate is in facing relation with an inner face of said second plate; and a portion of an inner periphery of at least one of said first and second holes of said second plate is in facing relation with an inner face of said first plate.

18. A gasket assembly as recited in claim 17, wherein each of said holes has a common diameter.

19. A gasket assembly as recited in claim 18, wherein a carrier is disposed between said first and second plates, said carrier including a hole defining a portion of said aperture.

20. A gasket assembly as recited in clam 19, further comprising a threaded fastener with a major thread diameter and a minor thread diameter, a root defined between adjacent crests, the fastener adapted to clamp mating components, wherein said inner periphery of said holes of said plates forming said aperture define a diameter greater than said minor thread diameter and less than said major thread diameter.

21. A gasket assembly as recited in claim 20, wherein said plates have a thickness less than a corresponding extent between adjacent crests of said threaded fastener such that an edge of at least one of said plates is adjacent said root of said fastener.

* * * * *